United States Patent [19]
Schwarz et al.

[11] Patent Number: 6,056,634
[45] Date of Patent: May 2, 2000

[54] METHOD AND APPARATUS FOR FORMING UNIFORM, THINLY COHERED PRODUCTS FROM CHUNKS OF MEAT

[75] Inventors: Gunther Schwarz, Waterloo; Morris Herbert Friske, Edmonton; Peter Hugh Davies, Leduc, all of Canada

[73] Assignee: Handtmann Piereder Machinery Ltd., Waterloo, Canada

[21] Appl. No.: 08/658,781

[22] Filed: Jun. 5, 1996

[51] Int. Cl.[7] .................................................. A22C 11/02
[52] U.S. Cl. .............................. 452/27; 452/35; 366/337
[58] Field of Search ....................... 452/27, 35; 366/167, 366/173, 337, 340

[56] References Cited

U.S. PATENT DOCUMENTS

| | | | |
|---|---|---|---|
| 4,334,783 | 6/1982 | Suzaka | 366/341 |
| 4,674,888 | 6/1987 | Carlson | 366/337 |
| 4,741,906 | 5/1988 | Paardekooper et al. | 426/59 |
| 4,869,594 | 9/1989 | Mahoney, Jr. | 366/337 |
| 5,100,363 | 3/1992 | Kern et al. | 452/27 |
| 5,333,952 | 8/1994 | Perdue | 366/340 |

*Primary Examiner*—Willis Little
*Attorney, Agent, or Firm*—Ridout & Maybee

[57] ABSTRACT

Apparatus for applying a thin liquid coat to muscle meat comprises a conduit of generally constant cross-section along which the muscle meat is forced under pressure. The conduit has an entry port for the introduction of the liquid, and fixed structure is provided for promoting the relative movement of the meat chunks within the conduit to cause the liquid material to be smeared over the surface of the meat chunks. Suitably the fixed structure comprises at least one zone wherein the cross-section differs from that of the conduit. The cross-section of the zone may be characterized by one or more of an increased cross-section area, or by a decreased cross-sectional area, or by a different aspect ratio. The liquid may be one part of a two part settable adhesive; the other part of which is applied to the meat separately from the one part.

18 Claims, 6 Drawing Sheets

METHOD AND APPARATUS FOR FORMING UNIFORM, THINLY COHERED PRODUCTS FROM CHUNKS OF MEAT

FIELD OF INVENTION

This invention relates to meat processing apparatus and method. It particularly relates to apparatus and method which is suitable for the automated processing of chunks of meat, to form a composite mass, wherein the meat chunks are cohered by a thinly applied coat of adhesive.

BACKGROUND OF INVENTION

The process of packing chunks of meat to form composite meat products such as hams having a relatively uniform consistency throughout, for example as described in U.S. Pat. Nos. 3,076,713 and 4,337,597 is carried out by mechanically working the meat chunks, usually with added salt, to form a heavy porridge like exudate on the surface of the meat, which is then packed into bulk portions and cured. It is also known, as described in U.S. Pat. No. 5,100,680, to form the exudate separately, and to mix this with chunks of meat using a stirrer, following which the mixed mass is packed and cured.

The above processes may be carried out using substantially automated apparatus, for example as described in U.S. Pat. No. 4,060,349 which discloses an oscillating vane meat pump, and U.S. Pat. Nos. 4,188,767; 4,417,484; 4,651,498 and 5,352,151 which disclose portioning and stuffing apparatus, all of which are commonly assigned herewith or to a predecessor of the assignee hereof, and all of which are incorporated herein by reference thereto.

In U.S. Pat. No. 4,741,906, the contents of which are incorporated herein by reference thereto, there is described a method of bonding meat chunks using a thin coat of bonding agent. In accordance with this process, a two part settable adhesive is employed to coat the surface of the muscle meat. The first of the parts comprises a solution of fibrinogen, and the second comprises a solution of thrombin, which parts optionally include factors such as transaminase and calcium ions for example, which may affect the rate of set-up of the adhesive and the strength of the bonds created thereby.

Although the aforementioned two-part adhesive has been generally known for several years, its use has been limited to the hand packing methods. Several attempts have been made heretofore to adapt the method for use with mechanized packing machinery, particularly where the meat comprises smaller chunks (the so called B cuts), without success. Currently these B cuts of meat are processed into ground meat often at an economic loss to the packer.

One reason for the failure to adapt the adhesive for commercial use is that if the adhesive is applied by conventional mixing apparatus, the adhesive is found to set up on the walls of the apparatus to form an intractable coating during the course of an average working shift, which requires considerable labour for its removal. A further reason is that the adhesive is applied to the muscle meat as a thin surface coat, and in the event that the meat is sheared subsequently to its being coated with either or both parts of the adhesive, this will lead to zones of cohesive non-uniformity within the finished product. Accordingly, when such thinly bonded product is sliced, it may disintegrate at the non-uniformity, leading to product rejection and loss. The problem associated with shearing is not encountered where meat exudate is used for bonding because of the relatively large amount of exudate that is normally present which provides a thick, flowable envelope about the meat prior to its being coagulated.

It is an object of this invention to provide a method for applying a thin, uniform coating of liquid material to the surface of chunks meat.

It is another object of this invention to provide such method which is suitable where the liquid material is a two part adhesive.

It is yet another object of this invention to provide a generally automated method for uniformly cohering meat chunks using a thinly applied two part adhesive.

It is still another object of this invention to provide a method in accordance with any of the foregoing objects which is suitable for use with packing machinery with relatively little change thereto.

It is a further object of this invention to provide improvements to adapt commercially available automatic meat packing machinery and to modify existing machinery so as to be utilizable both for the formation of traditionally thickly bonded meat chunk products and for the formation of thinly bonded meat chunk products, particularly where the thin bonding agent is a two part settable adhesive.

It is yet another object of this invention to provide method and apparatus for economically processing small cuts of meat to significantly increase the value thereof.

SUMMARY OF THE INVENTION

In accordance with customary apparatus of the prior art which is used for packing meat chunks, such apparatus comprises a stirred meat hopper, a packing unit, a conduit having a more or less constant cross-section interconnecting the hopper to the packing unit, and a meat pump for forcing the meat chunks through the conduit.

In accordance with this invention, the apparatus is characterized by an injection port disposed in the conduit; an injector for injecting a liquid to be coated on to the surface of the meat chunks, and fixed means associated with the conduit disposed downstream of the injection port to promote the relative movement of the meat chunks within the conduit, and thereby cause the liquid to be smeared over the surface of the meat chunks.

Accordingly, the preferred forms of the conduit have no moving parts, and since the surface area is relatively small and constantly scrubbed by the meat passing therethrough, the set-up of adhesive within the conduit is substantially diminished if not totally avoided, and the conduit is relatively easy to clean. Cleaning may be further facilitated by providing the conduit with quick release couplings intermediate the entrance and exit, which couplings are well known in the meat packing art. The axial length of such conduit is relatively small whereby it may in whole or in part replace the fixed diameter tubular conduit of existing machines so as to modify them for the present purposes. Moreover, the modified machines may be used with the exudate method of bonding the muscle meat.

Suitably and preferably, the fixed means associated with the conduit for promoting the relative movement of the chunks of meat includes at least one zone formed in the conduit wherein the cross-section will differ from the normally constant cross-section of the conduit. The difference may be characterized by the cross sectional area thereof increasing to a value which is greater than that of the constant cross-section, suitably with a ratio of the cross-sectional areas (hereinafter referred to merely as the ratio) of between about 4:1 to about 8:1, with 6:1 being preferred.

The increased cross-sectional area promotes the piling up and intermingling of the meat chunks within the zone. The difference in the cross-sections may alternatively be characterized by the cross-sectional area of the zone diminishing to a value which is less than that of the constant cross-section, so as to form a flow restricting orifice; suitably the ratio will be between about 0.7 to 0.9, with a ratio of about 0.8 being preferred. The meat chunks, particularly where these are of the B cut type mentioned above, will have an aspect ratio typically in the range of between about 5:1 to about 5:3, and the chunks will flow through the conduit in a haphazardly disoriented and intermingled relationship. Where the chunks encounter the entrance to the restricting orifice they will tend to orient themselves with their major aspect aligned with the direction of flow, and thus undergo a relative movement. The chunks will be forced through the orifice and undergo a plastic elongation therein thereby exposing a greater surface area of meat. A reservoir of liquid being applied to the meat will tend to accumulate around the entrance to the orifice and coat the surface of the meat passing into the orifice. As the meat exits the orifice the chunks will tend to revert to their non-aligned, disoriented state within the conduit, and thereby undergo further relative movement the total effect being to smear and transfer the coating liquid from surface to surface of the meat chunks and thereby form a relatively uniform coat.

The difference in the cross-sections may be still otherwise characterized by the change of shape of the cross section. Thus, that of the conduit in the constant cross-section portion thereof will normally be circular, and while the shape of the cross section of the zone may be elongated, suitably with an aspect ratio between about 4:1 to about 5:1, with a value of about 4.7:1 being preferred. It will be appreciated that the cross section within the zone may be characterized by more than one of the above mentioned features, and preferably an aspect ratio of about 4.7:1 and a ratio of cross sectional areas of about 0.8 is found to be most preferred for processing a wide range of meat chunks.

In general it will be found to be preferable that there is a gradual transition rather than an abrupt transition between the conduit and the zone of differing cross-section exhibiting the maximum difference, so as to promote the flow of meat chunks between the meat hopper and the packing unit.

Also in general it will be found to be preferable to provide two zones, and where these zones have an aspect ratio of greater than 1, the maximum aspect value of any zone will be preferably disposed in a plane at right angles to the plane in which the maximum aspect of an adjacent zone is disposed. This has the effect of exposing different surfaces of the meat chunks to the small reservoir of coating liquid formed adjacent to the entrance to the restricting orifice, and enhancing the uniformity of coating of the liquid onto the surface of the meat chunks.

The meat pump described in the apparatus of the preferred embodiment advances the meat chunks through the conduit in a pulsating, intermittent manner, and preferably the injector includes a pump which serves to inject the liquid material through the port in an intermittent manner in unison with the advancement of the meat chunks within the conduit.

Still further in accordance with the preferred embodiment wherein the apparatus is adapted for use in coating meat chunks with a two part settable adhesive, the apparatus may include a stirred hopper connected to the inlet of the meat pump, and means is provided for adding one part of a two part settable adhesive to the hopper, the second part being added within the conduit in the foregoing manner.

In accordance with the method aspect of the invention, the two parts suitably comprise fibrinogen and thrombin, with the former being added to the hopper and the latter which is used in lesser amount being added to the conduit.

The foregoing aspects of the apparatus and method of the invention will be described in greater detail, together with other aims, aspects, objects and advantages thereof in the following description of the preferred embodiments thereof.

DESCRIPTION OF THE PREFERRED EMBODIMENT

Figure 1:
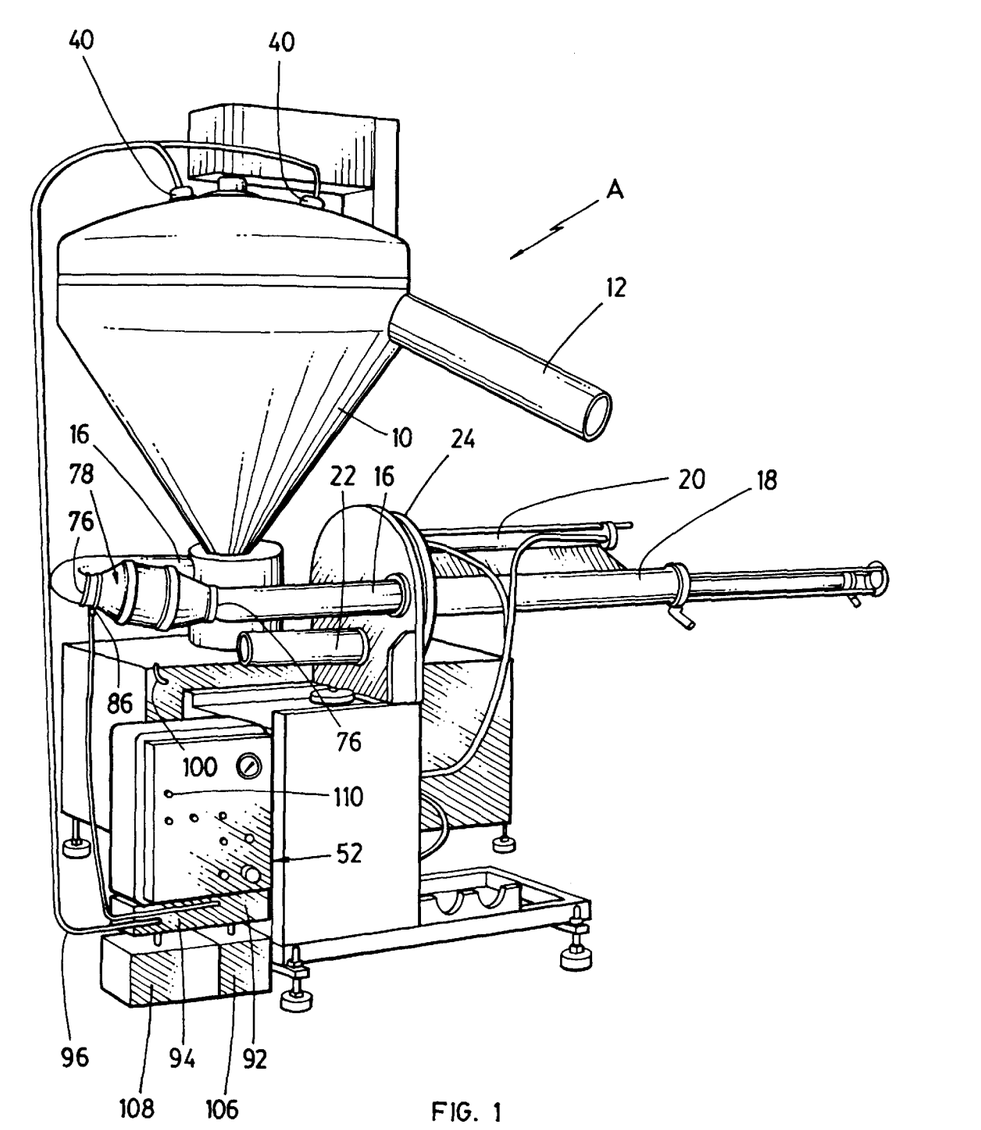
FIG. 1 is a perspective view of apparatus for packing meat chunks in accordance with a first embodiment of the invention.
Figure 2:
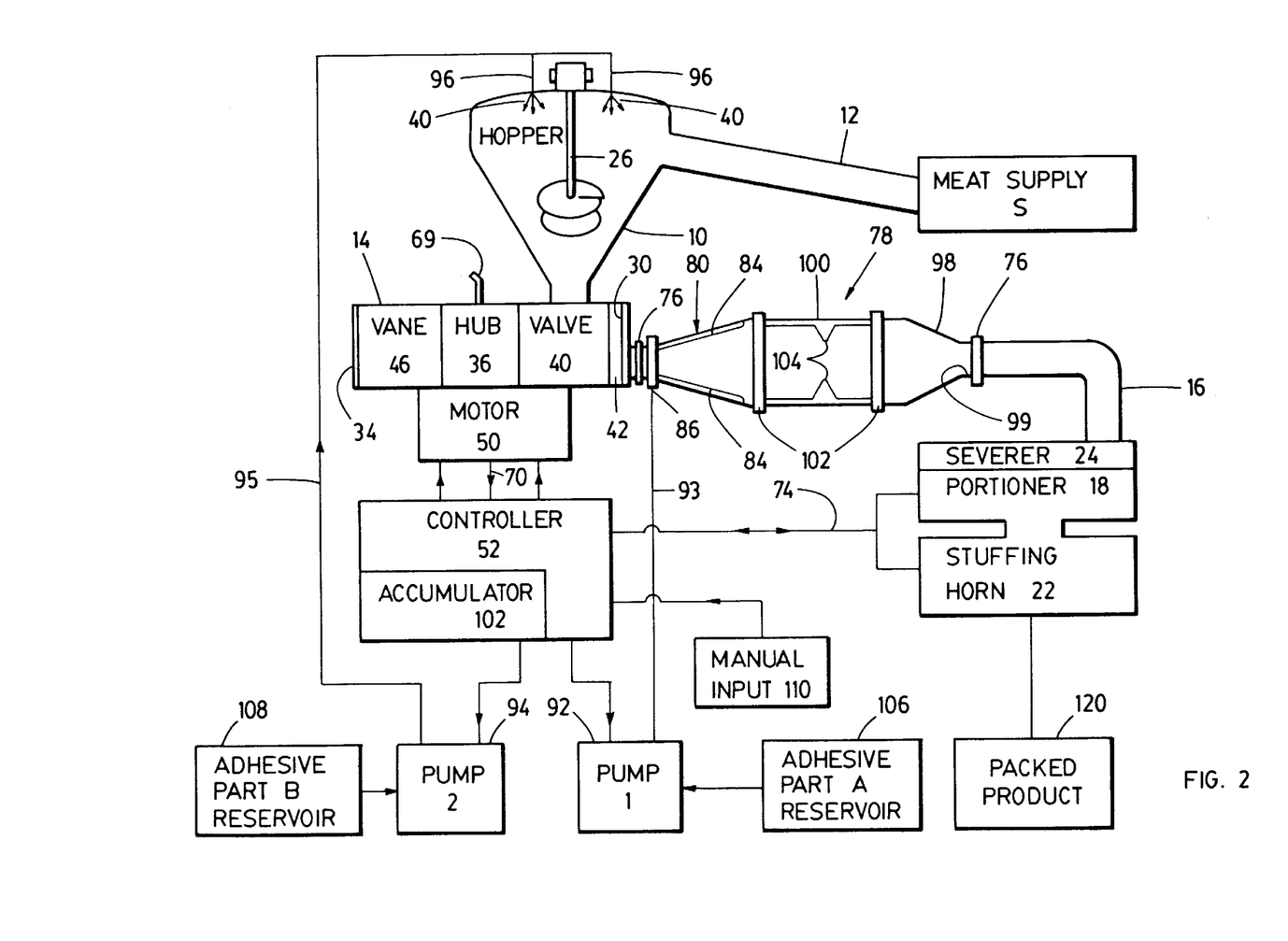
FIG. 2 is a schematic of the apparatus of FIG. 1.
Figure 3:
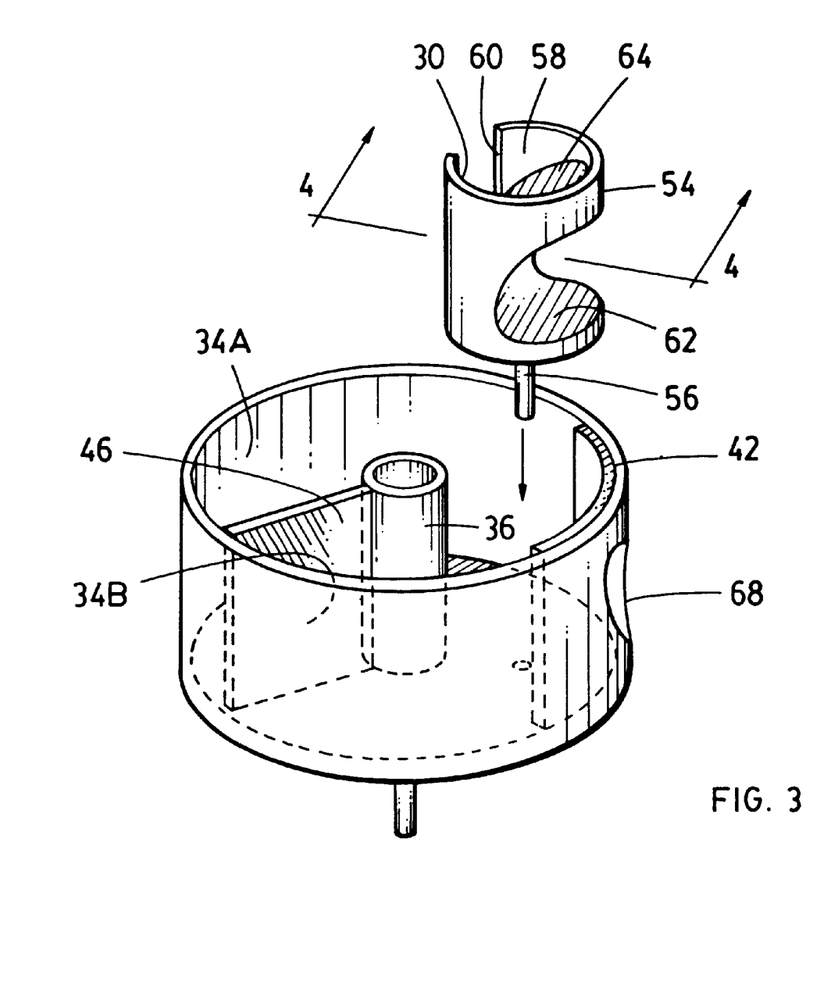
FIG. 3 shows the meat pump used in the apparatus of FIG. 1 in exploded, perspective view.

Referring to the drawings in detail, a meat packing apparatus is denoted generally therein by the letter A. Apparatus A comprises a hopper 10, with a supply tube 12, a meat pump 14, which connects to the bottom of the hopper, a conduit 16 which connects the outlet of the meat pump to a portioner 18, which serves to divide the output from the meat pump accurately into pre-determined portions, and a stuffer 20 which stuffs the portions into a casing (not shown) disposed on a stuffing horn 22. The portioner 18 and stuffer 20 are mounted from a rotary plate 24, the rotation of which serves to sever the meat contained in the portioner from meat contained in the conduit 16. A stuffer-proportioner of this nature is more particularly described in U.S. Pat. No. 4,651,498 commonly owned herewith. Hopper 10 includes a mixing auger 26 which serves to agitate the meat contained within the hopper, and to urge the meat towards the entrance 30 to pump 14. Pump 14 comprises a cylindrical chamber 34 within which there is disposed a hub 36 mounted for rotation about the axis of the chamber. A rotary valve 40 is disposed within chamber 34 at one radial side thereof in parallel contiguous relationship with the hub 36 along the length thereof so as to form a sealing surface therewith. Valve 40 includes a valve seat 42 mounted from the inner wall of chamber 34, the valve and hub 36 thereby serving as a barrier within chamber 34. A vane 46 is secured to hub 36 for rotation therewith, the vane and valve 40 serving to divide chamber 34 into two parts, 34a and 34b. A motor 50 drives hub 36 and vane 46 therewith under the influence of a controller 52.

Figure 4:
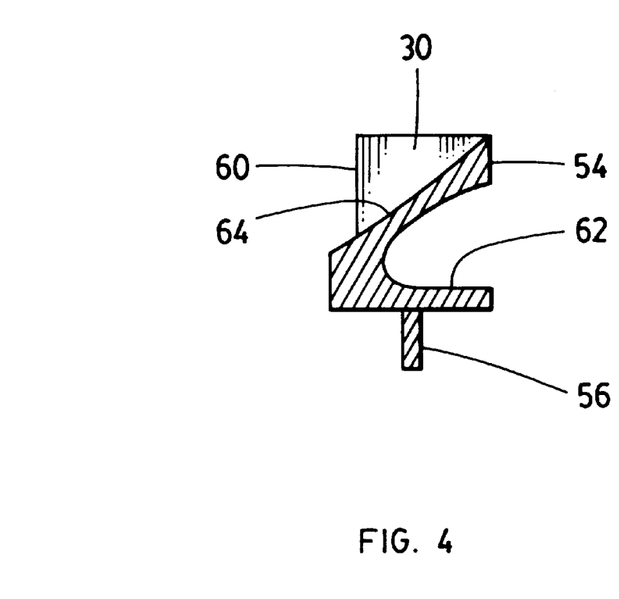
FIG. 4 is a cross-section of the valve of the meat pump taken on the line 4—4 of FIG. 3.

Valve 40 comprises a cylindrical body 54 mounted for rotation within chamber 34 in parallel relationship to hub 36 by a drive shaft 56. Body 54 is hollow at the upper end 58 thereof, in effect forming the entrance 30 to valve 40, and is provided with an axial slot 60 passing through the peripheral wall of the body in communication with entrance 30. Body 54 is also provided with a radial slot 62 diametrically opposed to axial slot 60 and axially separated therefrom by an internal wall 64. Valve 40 provides two distinct and separate flow paths therethrough which, with the body 54 in the rotational position shown in FIG. 3, respectively serve to connect hopper 10 to chamber 34a and chamber 34b to opening 68 through the peripheral wall of chamber 34, it being understood that valve seat 42 is provided with a corresponding opening therethrough. When valve body 54 is rotated through an angle of about 135°, the upper of the flow paths will connect hopper 10 chamber port 34b, while the lower flow path will connect chamber 34 a to wall opening 68.

Hopper 10 and its associated parts and meat pump 14 as thus far described are known in the prior art and form part of meat processing apparatus model no. HVF90 available from the assignee hereof. Also, a precursor of meat pump 14 is described in aforementioned U.S. Pat. No. 4,060,349.

Typically, meat pump 14 may have a throughput of up to about 50 tonnes in the course of a working shift of 8 hours, producing about 2,000 to 10,000 packages, depending upon the size selected. The operation of the meat pump 14 is as follows: assuming the parts to be in their relative positions of rotation as seen in FIG. 3, chamber part 34B will be full of meat and controller 52 will actuate motor 50 to drive vane 46 in a clockwise direction, whereby the contents of chamber part 34b will be expelled through slot 62 and opening 68. Simultaneously, the volume of chamber part 34a will increase, whereby meat will flow into the chamber from hopper 10 under the influence of auger 22 and the movement of vane 46, which will tend to create a vacuum in chamber part 34a, and which is assisted by a vacuum applied at port 71 which evacuates pump 14. When vane 46 reaches its travel limit in close proximity to valve 40, motor 50 provides a signal to controller 52 on line 72 to cause the reversal of rotation of vane 46, and simultaneously the reversal of valve body 54, so that meat is expelled from chamber part 34a and chamber part 34b is filled from hopper 10. This reversal of rotation will momentarily arrest the flow of meat through outlet opening 68. Portioner 18 and stuffer 20 will also require the arrest of output from pump 14 from time to time, and an appropriate signal is provided to controller 52 on line 74. Rotary valve 40 is preferably machined from plastic material, and in operation it is found that it permits some slippage of meat as body 54 is rotated whereby chunks of meat which bridge openings 60 and or 62 when the valve is actuated may return towards hopper 10, or towards the chamber part 34a or 34b as the case may be, and very little shearing of meat is found to occur in meat pump 14.

The conduit 16 of apparatus A of the prior art is normally of more or less constant diameter therealong, and may comprise two or more sections joined together by couplings 76 which facilitate the disassembly of the conduit for cleaning purposes.

Figure 5:
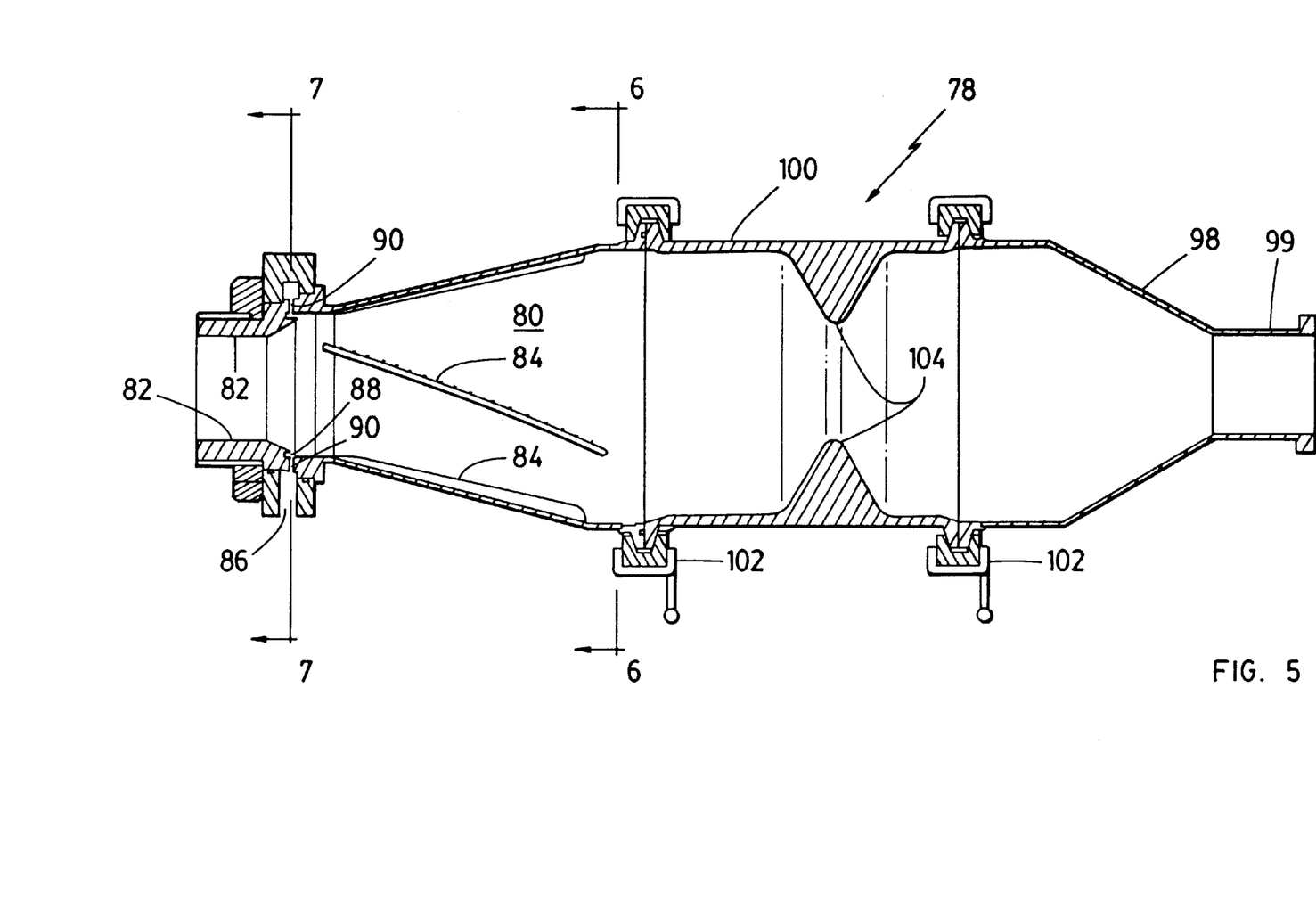
FIG. 5 shows a longitudinal cross-section of a mixing conduit which forms a part of the apparatus of FIG. 1.

Considering now the adaptation of apparatus A in accordance with the invention, conduit 16 will include a mixing portion 78 which conveniently connects to the remaining portions of the conduit by couplings 76 or any other convenient means.

Figure 6:
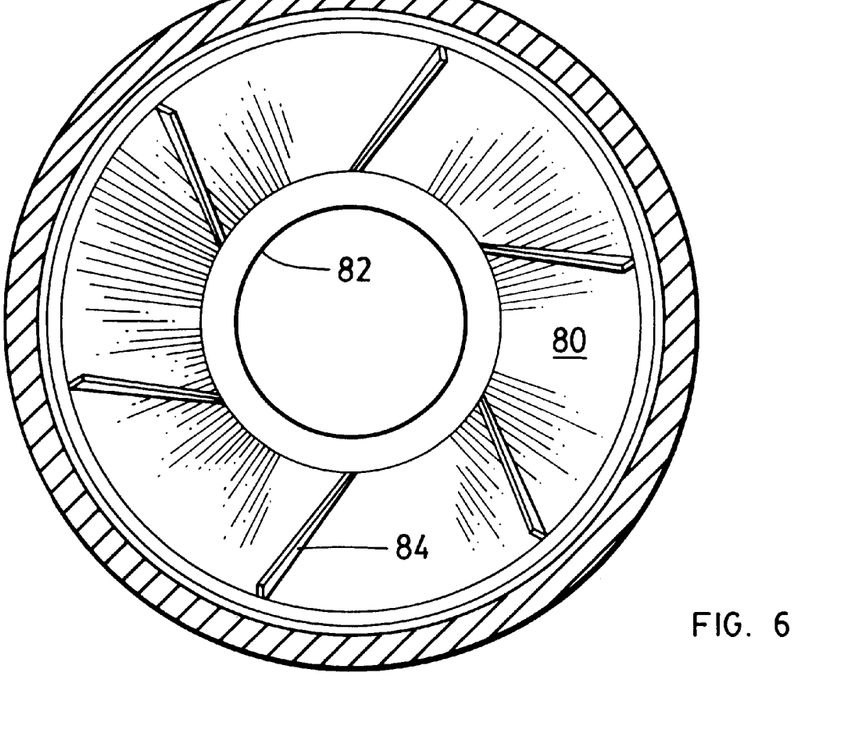
FIG. 6 shows an elevational view of the mixing conduit in the direction 6—6 of FIG. 5.
Figure 7:
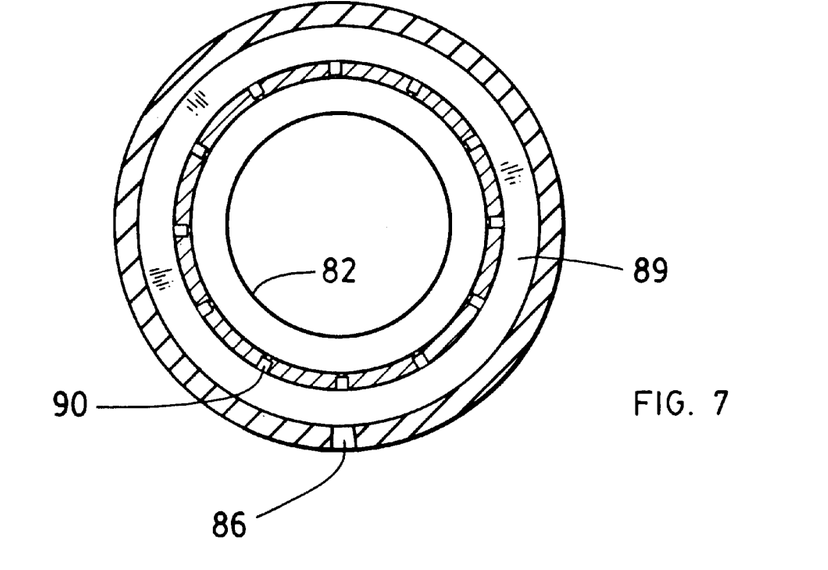
FIG. 7 is a transverse cross section in the plane 7—7 of FIG. 5.

Portion 78 includes a first conical chamber 80 having an entrance 82. A plurality of fins 84 are secured to the interior surface of conical chamber 80 in equispaced, skewed relationship. Considering the entrance 82 to have a diameter of dimension D, which may normally be about 10 cm, typically and conveniently conical chamber 80 may expand to a diameter of about 2.5D over an axial length of about 4D. Also typically and conveniently, fins 84 will increase in height over their length to a maximum height of about D/8, and have a pitch of about 20°. Conduit mixing portion 78 is provided with an injection port 86 adjacent to the smaller end of conical chamber 80, which port connects internally to a narrow groove 88 circumscribing the interior wall of the chamber by a manifold 89 and a plurality of openings 90. A first liquid pump 92 which operates under the control of controller 52 connects to injection port 86 on supply tube 93. A second liquid pump 94 also operating under the control of controller 52 connects by means of supply tube 95 to spray heads 96 disposed in the upper regions of hopper 10.

Conduit mixing portion 78 comprises a second conical chamber 98 which is inverted in comparison to the first conical portion 80, the two chambers being desirably coupled together at their base by a central tubular chamber 100 by means of a quick release coupling 102 of a type which is commonly used in the food processing industry. The cross sectional area of second conical chamber 98 diminishes along its length to a diameter at exit 99 approximately equal to that of entrance 82 so as to be suitable for coupling mixing portion 78 to conduit 16 of uniform diameter. Central tubular chamber 100 has a throat restriction 104 therein which serves to reduce the internal diameter of the chamber to approximately a diameter D. Preferably, the decrease is relatively abrupt, suitably over an axial length of approximately D/2, following which the diameter of the central chamber expands abruptly.

Considering now the operation of apparatus A as adapted in the foregoing manner for use in cohering muscle meat with a two part settable adhesive such as that disclosed in the above mentioned U.S. Pat. No. 4,741,906, the two parts of the adhesive are stored separately in reservoirs 106, 108. Preferably the adhesive part that is used in the smaller quantity, in this instance the thrombin solution, is stored in reservoir 106 for injection into conduit mixing portion 78, and the solution which is used in the larger quantity, in this case the fibrinogen solution, is stored in reservoir 108 for injection into hopper 10, as the residence time of meat within the hopper is substantially greater than the residence time of the meat within the conduit, as will be clear from the following description, so permitting more time for the larger amount of adhesive component to be coated onto the surface of the muscle meat.

Liquid pumps 92, 94 will be set to pump the first and second adhesive parts in the desired ratio at a rate which is proportional to the throughput of meat pump 14 and which is also related to the surface area of the muscle meat being processed. The latter factor is assessed by the operator of apparatus A and may be input manually at 110 into controller 52. Suitably, the operation of liquid pump 92 is tied by controller 52 to the status of vane 46, whereby operation of the pump will be arrested for such time as movement of the vane is arrested, so as not to create an imbalance of the adhesive part supplied within mixing conduit 78. While the capacity of hopper 10 is relatively large in comparison to that of mixing conduit 78, in practise it will provide a supply of muscle meat for a duration of only some 2 to 5 minutes of operation of meat pump 14. Preferably hopper 10 will be replenished through supply tube 12 on a more or less continuous basis. However, it is often found to be more convenient to replenish the hopper 10 periodically, in which event it is desirable to control the input of the first adhesive part to correspond with the replenishment of the hopper. Conveniently, when hopper 10 is operated so as to be replenished periodically, controller 52 will include an accumulator 112 to calculate the volume of the adhesive part to be delivered by pump 94 with each replenishment of hopper 10.

The extrusion of muscle meat from pump 14 into conduit 16 maintains the conduit including mixing portion 78 filled at all times without air voids, and maintains a positive pressure within the conduit. The injection of the liquid adhesive part into injection port 86 against the pressure within conduit 16 will cause the adhesive part to flow in a substantially uniformly distributed manner around groove 88, and onto the surface of the muscle meat contiguous with the interior wall of the first conical chamber 80 in portions thereof adjacent to the entry injection port. The expanding cross-sectional area of conduit chamber 80 causes the muscle meat to tumble and roll inwardly towards the center of the chamber as the meat advances along the first portion of the mixing conduit, against the back pressure created by throat 104, which movement is also accompanied by a helical component created by the fins 84. The compound movement of the meat within first conical chamber 80 is found to smear the liquid injected at injection port 86 in a substantially uniform manner over the surface of the meat, where it mixes with the other part of the adhesive previously coated onto the meat. The tumbling and rolling action of the meat within first conical chamber 80 is continued in part as the meat emerges from throat 104 to pass into the second conical chamber 98, to assist in the coating of the adhesive in a uniform manner.

The residence time within conduit 16 of meat coated with both parts of the adhesive mixture is low, and given that the conduit is filled at all times, the meat exerts a strong wiping action over all internal wall surfaces thereof so that no set-up of the adhesive is found to occur within the conduit even after prolonged periods of operation of apparatus A. Moreover, the conduit 16 is easily disassembled by means of quick release couplings 102 and screw type couplings 76 for cleaning purposes.

The muscle meat coated with the two part adhesive in the foregoing manner is portioned using portioner 18, severed using severer 24, and stuffed into casings using stuffer 20, all of which are more particularly described in the aforementioned patents, to form a packed product 120, and following the curing of the adhesive within the casing, the packed meat is found to form a uniform, thinly cohered mass with no evidence of non-cohered portions.

Figures 8, 10:
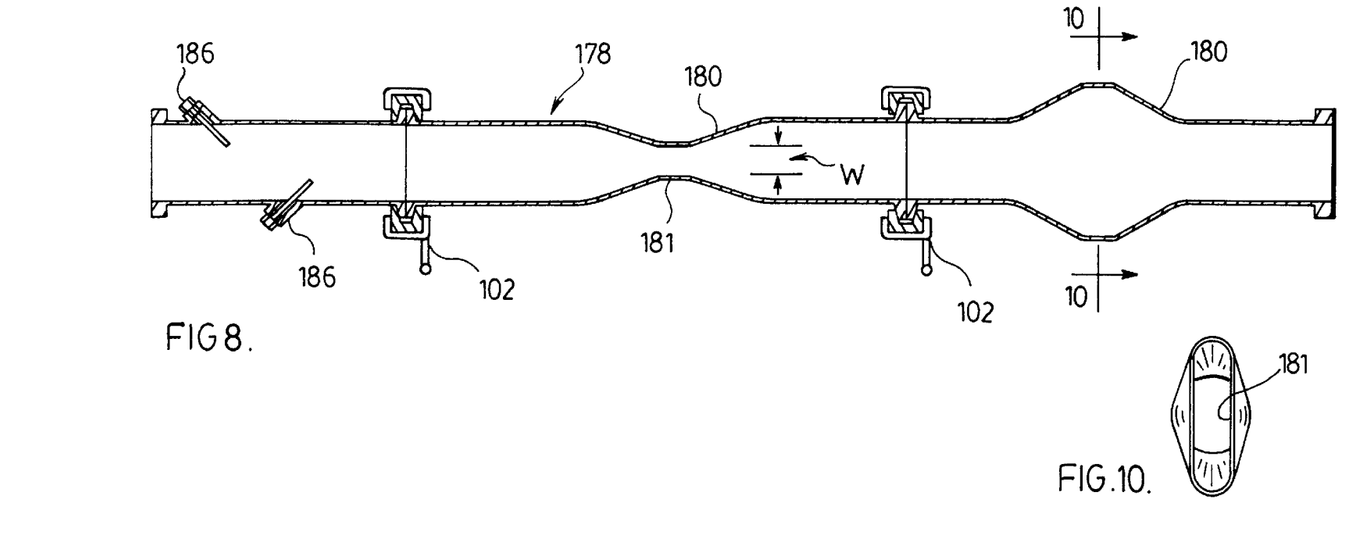
FIG. 8 is a longitudinal cross-section in a vertical plane of a second embodiment of a mixing conduit which may be used to replace that seen in FIG. 5.
FIG. 10 is a longitudinal cross-section through line 10—10 of FIG. 8.
Figure 9:
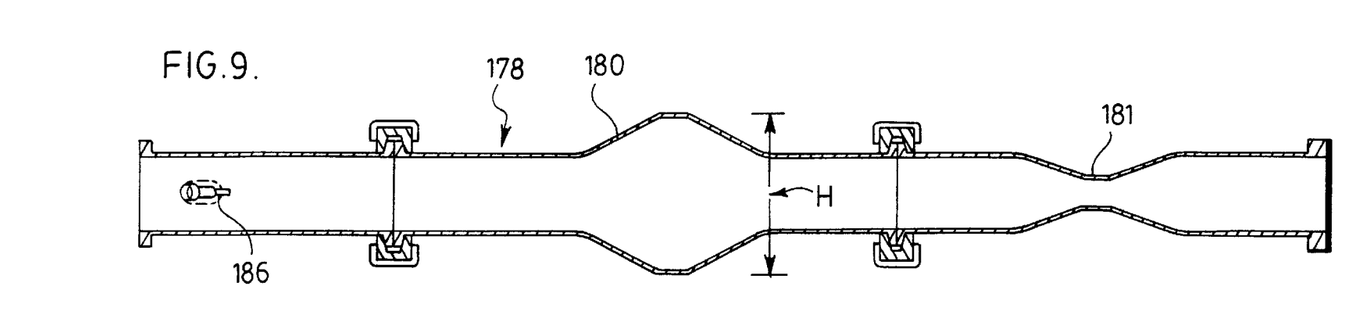
FIG. 9 is a longitudinal cross-section in a horizonal plane of the mixing conduit of FIG. 8.

Considering now the adaptation of apparatus A in accordance with a second embodiment of the invention, conduit 16 will include a mixing conduit portion 178 which will be employed instead of conduit mixing portion 78 of the first embodiment. Conduit portion 178 includes a first zone and second flared zones 180 in series flow relationship. Each of the flared zones 180 is progressively flattened in a plane at right angles to the plane of the flare, and the plane of the flare of the one zone is disposed at right angles to the plane of the flare of the adjacent zone. Each flared zone 180 has a major dimension H and a minor dimension W, the ratio H:W of which defines the aspect ratio of the most restrictive portion of the zone, which may otherwise be referred to as the orifice 181 of the zone, and which will suitably have a value of about 4.7:1, although this may be varied somewhat in accordance with the size or size range of the chunks of meat being processed. Orifice 181 in this second embodiment has a cross-sectional area which is less that of conduit 16 so as to form small flow restriction to meat chunks passing through the conduit; suitably the ratio of the cross-sectional areas in about 0.8:1.

The conduit mixing portion 178 suitably and preferably include quick couplings 102 to permit the mixing conduit to be easily disassembled for cleaning purposes, and/or to change the mixing portion 178 to another mixing portion of different characteristics.

The flow of meat chunks through mixing conduit 178 is considered to be from left to right in the illustrations and an injector parts port is provided adjacent the upstream end of the mixing conduit, comprising a pair of nozzles 186 which will be understood to be coupled in flow relationship with supply tube 93.

When conduit mixing portion 178 is coupled to conduit 16 in the apparatus of FIG. 2 in the place of conduit 78, apparatus A will be utilized in the same manner as that described above in relation to the first embodiment. Experience has shown that the mixing conduit 178 of this second embodiment gives preferred results with smaller cuts of meat, while mixing conduit 78 of the first embodiment may be more suited for use with larger cuts.

It will be apparent that many changes may be made to the illustrative embodiment while falling within the scope of the invention, and it is intended that all such changes be covered by the claims appended hereto.

We claim:

1. An apparatus for packing meat chunks including a meat pump, a packing unit and a cylindrical conduit having a generally constant cross-section therealong interconnecting said meat pump and said packing unit;

characterized by an injection port disposed in said conduit;

an injector for injecting a liquid material through said port;

and fixed means associated with said conduit disposed downstream of said port for promoting a relative movement of said meat chunks within said conduit to cause said liquid material to be smeared over the surface of said meat chunks;

wherein said fixed means includes at least one zone having a cross-sectional area greater than that of said generally constant cross-section.

2. An apparatus as defined in claim 1 wherein the cross-sectional area of said at least one zone increases gradually to a maximum value.

3. An apparatus as defined in claim 2 wherein said maximum value is about 6 times that of said generally constant cross section.

4. An apparatus as defined in claim 2 wherein a plurality of fins are provided within said at least one zone, each said fin having an axis skewed in relation to the axis of said conduit so as to introduce a helical flow component to said meat chunks.

5. An apparatus as defined in claim 1 wherein at least two zones are provided.

6. An apparatus as defined in claim 1 wherein said meat pump advances said meat chunks through said conduit in an intermittent manner, and wherein said injector includes liquid material pump means for injecting said liquid material through said port in an intermittent manner in unison with the advancement of said meat chunks through said conduit.

7. An apparatus for packing meat chunks including a meat pump, a packing unit and a cylindrical conduit having a generally constant cross-section therealong interconnecting said meat pump and said packing unit;

characterized by an injection port disposed in said conduit;

an injector for injecting a liquid material through said port;

and fixed means associated with said conduit disposed downstream of said port for promoting a relative movement of said meat chunks within said conduit to cause said liquid material to be smeared over the surface of said meat chunks wherein said at least one zone gradually diminishes in cross-sectional area to a value less than that of said generally constant cross-section and a cross-section of said at least one zone has an aspect ratio which differs substantially from an aspect ratio of said generally constant cross-section.

8. An apparatus as defined in claim 7 wherein the cross-sectional area of said at least one zone has a minimum value in the range of about 0.9 to about 0.7 times that of said generally constant cross-section.

9. An apparatus as defined in claim 7 wherein the aspect ratio of said at least one zone has a maximum value in the range of about 4:1 to about 5:1, and that of said generally constant cross-section has a value of unity.

10. An apparatus as defined in claim 9 wherein at least two said zones are provided, and wherein the maximum aspect value of any zone is disposed in a plane at right angles to the plane in which the maximum aspect value of any adjacent said zone is disposed.

11. An apparatus as defined in claim 10 wherein each of said zones has an aspect ratio of about 4.7:1.

12. An apparatus for packing meat chunks including a meat pump, a packing unit and a cylindrical conduit having a generally constant cross-section therealong interconnecting said meat pump and said packing unit, said conduit having a conduit wall with an interior surface;

characterized by an injection port disposed in said conduit;

an injector for injecting a liquid material through said port;

and fixed means associated with said conduit disposed downstream of said port for promoting a relative movement of said meat chunks within said conduit to cause said liquid material to be smeared over the surface of said meat chunks;

wherein said injection port comprises a groove circumscribing said interior surface of said conduit wall, and a plurality of liquid flow openings communicating with said groove.

13. An apparatus for packing meat chunks including a meat pump, a packing unit and a cylindrical conduit having a generally constant cross-section therealong interconnecting said meat pump and said packing unit;

characterized by an injection port disposed in said conduit;

an injector for injecting a liquid material through said port;

and fixed means associated with said conduit disposed downstream of said port for promoting a relative movement of said meat chunks within said conduit to cause said liquid material to be smeared over the surface of said meat chunks;

wherein said meat pump includes an inlet and wherein said apparatus includes a stirred hopper having an outlet connected to the inlet of said meat pump, and means is provided for injecting a second liquid material into said hopper for coating meat chunks contained therein.

14. An apparatus as defined in claim 13 wherein said means for injecting a second liquid includes means responsive to the rate of feed of meat chunks into said hopper for controlling the volume of said second liquid material injected into said hopper in proportion to said rate of feed.

15. A method of forming a substantially uniformly bonded meat mass from chunks of meat utilizing a two part settable bonding agent using automated packing equipment including a stirred meat hopper, a packing unit, a conduit connecting said hopper to said packing unit, and a non-shearing type meat pump for forcing said meat chunks through said conduit;

characterized wherein one part of said two part bonding agent is added to said meat chunks within said hopper and the other part is added to said meat chunks within said conduit.

16. A method as defined in claim 15 wherein the two part of said bonding agent comprise fibrinogen and thrombin.

17. A method as defined in claim 16 wherein said fibrinogen is added to said meat chunks in said hopper and wherein said thrombin is added to said meat chunks within said conduit.

18. A method as defined in claim 15 wherein said conduit is adapted to coat said meat chunks with said other part of said bonding agent by translating the movement of said meat chunks through said conduit under the influence of said meat pump.

* * * * *